US006951436B2

(12) United States Patent
Stegemeier et al.

(10) Patent No.: US 6,951,436 B2
(45) Date of Patent: Oct. 4, 2005

(54) THERMALLY ENHANCED SOIL DECONTAMINATION METHOD

(75) Inventors: George L. Stegemeier, Houston, TX (US); Harold J. Vinegar, Bellaire, TX (US); Eric P. de Rouffignac, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 125 days.

(21) Appl. No.: 10/279,771

(22) Filed: Oct. 24, 2002

(65) Prior Publication Data

US 2004/0126190 A1 Jul. 1, 2004

Related U.S. Application Data

(60) Provisional application No. 60/346,138, filed on Oct. 24, 2001.

(51) Int. Cl.[7] .................................................. B09C 1/06
(52) U.S. Cl. ............................ 405/128.4; 405/128.85
(58) Field of Search .................... 405/128.8, 128.85, 405/128.55, 128.6, 128.35, 128.4, 131

(56) References Cited

U.S. PATENT DOCUMENTS

| 2,777,679 A | 1/1957 | Ljunstrom |
| 2,902,270 A | 9/1959 | Salomonsson et al. |
| 3,181,613 A | 5/1965 | Krueger |

(Continued)

FOREIGN PATENT DOCUMENTS

| DE | 3716275 | 11/1988 |
| DE | 198 24 930 | 12/1992 |
| DE | 19707 096 | 5/1998 |
| DE | 196 48 928 | 6/1998 |
| DE | 198 01 321 | 7/1999 |
| DE | 199 27 134 | 12/2000 |
| EP | 592 225 | 4/1994 |
| GB | 1 366 357 | 9/1974 |
| WO | 98/52704 | 11/1998 |

OTHER PUBLICATIONS

U.S. Army Corps of Engineers Pamphlet EP 415–1–261, 1997, Chapter 6, 12 pages.
U.S. Appl. No. 09/549,902 to Vinegar et al. entitled, "Vapor Collection and Treatment of Off–Gas From an In–Situ Thermal Desorption Soil Remediation".
U.S. Appl. No. 10/279,758 to Vinegar et al. entitled, "Soil Remediation of Mercury Contamination".
U.S. Appl. No. 10/280,102 to Vinegar et al. entitled, "Isolation of Soil With a Low Temperature Barrier Prior to Conductive Thermal Treatment of the Soil".
Vinegar et al.; "In Situ Thermal Desorption of Soils Impacted with Chlorinated Solvents"; 1999; 23 pgs.
Vinegar et al.; "In Situ Thermal Desorption using Thermal Wells and Blankets"; 1998; 1 pg.

(Continued)

*Primary Examiner*—Michael Safavi
(74) *Attorney, Agent, or Firm*—Meyertons, Hood, Kivlin, Kowert & Goetzel, P.C.; Eric B. Meyertons

(57) ABSTRACT

A method is provided to remove contaminants from contaminated soil. The method may include withdrawing vapors from a vapor extraction well, estimating the amount of water vapor removed from the contaminated soil in the vapors being withdrawn from the vapor extraction well, and applying heat to the contaminated soil from a plurality of heater wells at a rate not greater than that which would vaporize the estimated amount of water vapor. The permeability of the soil may thereby increase by the application of heat. Six or more heat injection wells may be provided for each vapor extraction well, and the heat injection wells may be placed and energized in a regular pattern around the vapor extraction well, which may include multiple rings of heaters around each vapor extraction well.

70 Claims, 5 Drawing Sheets

U.S. PATENT DOCUMENTS

| | | |
|---|---|---|
| 3,684,037 A | 8/1972 | Bodine |
| 4,017,309 A | 4/1977 | Johnson |
| 4,276,164 A | 6/1981 | Martone et al. |
| 4,380,930 A | 4/1983 | Podhrasky et al. |
| 4,423,323 A | 12/1983 | Ellis et al. |
| 4,500,327 A | 2/1985 | Nishino et al. |
| 4,577,503 A | 3/1986 | Imaino et al. |
| 4,598,392 A | 7/1986 | Pann |
| 4,641,028 A | 2/1987 | Taylor et al. |
| 4,670,634 A * | 6/1987 | Bridges et al. .......... 405/128.6 |
| 4,704,514 A | 11/1987 | Van Egmond et al. |
| 4,842,448 A | 6/1989 | Koerner et al. |
| 4,860,544 A | 8/1989 | Krieg et al. |
| 4,973,811 A | 11/1990 | Bass |
| 4,974,425 A | 12/1990 | Krieg et al. |
| 4,984,594 A | 1/1991 | Vinegar et al. |
| 5,060,287 A | 10/1991 | Van Egmond |
| 5,067,852 A | 11/1991 | Plunkett |
| 5,076,727 A | 12/1991 | Johnson et al. |
| 5,114,497 A | 5/1992 | Johnson et al. |
| 5,152,341 A | 10/1992 | Kasevich |
| 5,169,263 A | 12/1992 | Johnson et al. |
| 5,190,405 A | 3/1993 | Vinegar et al. |
| 5,193,934 A | 3/1993 | Johnson et al. |
| 5,209,604 A | 5/1993 | Chou |
| 5,221,287 A | 6/1993 | Reinert |
| 5,221,827 A | 6/1993 | Marsden, Jr. et al. |
| 5,228,804 A | 7/1993 | Balch |
| 5,229,583 A | 7/1993 | van Egmond et al. |
| 5,232,951 A | 8/1993 | Pfingstl et al. |
| 5,233,164 A | 8/1993 | Dicks et al. |
| 5,244,310 A | 9/1993 | Johnson |
| 5,249,368 A | 10/1993 | Bertino et al. |
| 5,251,700 A * | 10/1993 | Nelson et al. .......... 405/128.6 |
| 5,255,742 A | 10/1993 | Mikus |
| 5,256,208 A * | 10/1993 | Rafson ................. 405/128.85 |
| 5,261,765 A * | 11/1993 | Nelson .................... 405/128.6 |
| 5,271,693 A * | 12/1993 | Johnson et al. .......... 405/128.4 |
| 5,305,239 A | 4/1994 | Kinra |
| 5,318,116 A | 6/1994 | Vinegar et al. |
| 5,340,236 A | 8/1994 | Ikenberry |
| 5,348,422 A | 9/1994 | Manchak, III et al. |
| 5,360,067 A * | 11/1994 | Meo, III .................... 405/131 |
| 5,362,397 A | 11/1994 | Cyr |
| 5,403,119 A | 4/1995 | Hoyle |
| 5,435,666 A | 7/1995 | Hassett et al. |
| 5,441,365 A | 8/1995 | Duffney et al. |
| 5,545,803 A | 8/1996 | Heath et al. |
| 5,547,311 A | 8/1996 | Kenda |
| 5,553,189 A | 9/1996 | Stegemeier et al. |
| 5,558,463 A | 9/1996 | Geisel |
| 5,569,154 A * | 10/1996 | Navetta ................. 405/128.85 |
| 5,613,452 A | 3/1997 | Marchesi et al. |
| 5,615,974 A | 4/1997 | Land et al. |
| 5,656,239 A | 8/1997 | Stegemeier et al. |
| 5,660,500 A | 8/1997 | Marsden, Jr. et al. |
| 5,674,424 A | 10/1997 | Iben et al. |
| 5,753,494 A | 5/1998 | Hater et al. |
| 5,779,762 A | 7/1998 | Kohr et al. |
| 5,788,412 A | 8/1998 | Jatkar |
| 5,813,799 A | 9/1998 | Calcote et al. |
| 5,829,918 A | 11/1998 | Chintis |
| 5,836,718 A | 11/1998 | Price |
| 5,997,214 A | 12/1999 | de Rouffignac et al. |
| 6,039,508 A | 3/2000 | White |
| 6,102,622 A | 8/2000 | Vinegar et al. |
| 6,419,423 B1 | 7/2002 | Vinegar et al. |
| 6,485,232 B1 | 11/2002 | Vinegar et al. |
| 6,543,539 B1 | 4/2003 | Vinegar et al. |
| 6,632,047 B2 | 10/2003 | Vinegar et al. |
| 6,688,387 B1 | 2/2004 | Wellington et al. |
| 6,824,328 B1 | 11/2004 | Vinegar et al. |
| 2002/0003988 A1 | 1/2002 | Mikus et al. |
| 2003/0110794 A1 | 6/2003 | Stegemeier et al. |
| 2003/0136558 A1 | 7/2003 | Wellington et al. |
| 2003/0192691 A1 | 10/2003 | Vinegar et al. |
| 2004/0120771 A1 | 6/2004 | Vinegar et al. |
| 2004/0120772 A1 | 6/2004 | Vinegar et al. |
| 2004/0228688 A1 | 11/2004 | Stegemeier et al. |
| 2004/0228689 A1 | 11/2004 | Stegemeier et al. |
| 2004/0228690 A1 | 11/2004 | Stegemeier et al. |

OTHER PUBLICATIONS

Conley et al.; "In Situ Thermal Desorption of Refined Petroleum Hydrocarbons from Saturated Soil"; 2000; pp. 1–10.

Hansen et al.; "In Situ Thermal Desorption of Coal Tar"; 1998; pp. 1–22.

Vinegar et al.; "Remediation of Deep Soil Contamination using Thermal Vacuum Wells"; Society of Petroleum Engineers; 1997; pp. 905–918.

Heron et al.; "Soil Heating for Enhanced Remediation of Chlorinated Solvents: A Laboratory Study on Resistive Heating and Vapor Extraction in a Silty, Low–Permeable Soil Contaminated with Trichloroethylene"; Environmental science & Technology; 1998; 32(10); pp. 1474–1481.

* cited by examiner

EIH-1

EIH-2

EIH-3

EIH-4

THERMALLY ENHANCED SOIL DECONTAMINATION METHOD

PRIORITY CLAIM

This application claims priority to U.S. Provisional Application No. 60/346,138 entitled "Thermally Enhanced Soil Decontamination Method," filed Oct. 24, 2001. The above-referenced provisional application is hereby incorporated by reference as if fully set forth herein.

BACKGROUND OF THE INVENTION

1. Field of Invention

The present invention generally relates to soil remediation systems. An embodiment of the invention relates to placement and operation of soil remediation wells within a treatment area to safely, efficiently, and economically remove or reduce soil contamination within the treatment area.

2. Description of Related Art

Contamination of soil has become a matter of concern in many locations. "Soil" refers to unconsolidated and consolidated material in the ground. Soil may include natural formation material such as dirt, sand, and rock, as well as other material, such as fill material. Soil may become contaminated with chemical and/or biological contaminants. Contamination of soil may occur in a variety of ways, such as material spillage, leakage from storage vessels, and landfill seepage. Additional public health concerns arise if the contaminants migrate into aquifers or into air. Soil contaminants may also migrate into the food supply through bioaccumulation in various species in a food chain.

There are many methods to remediate contaminated soil. "Remediating soil" means treating the soil to remove soil contaminants or to reduce contaminants within the soil (e.g., to acceptable levels). A method of remediating a contaminated site is to excavate the soil and to process the soil in a separate treatment facility to eliminate or reduce contaminant levels within the soil. Many problems associated with this method may limit its use and effectiveness. For example, dust generation that accompanies excavation exposes the surrounding environment and workers to the soil contamination. Also, many tons of soil may need to be excavated to effectively treat even a small contamination site. Equipment, labor, transport, and treatment costs may make the method prohibitively expensive compared to other soil remediation methods.

Biological treatment and in situ chemical treatment may also be used to remediate soil. Biological and/or chemical treatment may involve injecting material into the soil, such that the material reacts and/or moves contamination within the soil. A material injected during a biological or chemical treatment may be a reactant configured to react with the soil contamination to produce reaction products that are not contaminated. Some of the reaction products may be volatile. These reaction products may be removed from the soil.

The material injected during a chemical treatment may be a drive fluid configured to drive the contamination toward an extraction well that removes the contaminant from the soil. The drive fluid may be steam, carbon dioxide, or other fluid. Soil heterogeneity and other factors may, however, inhibit uniform reduction of contaminant levels in the soil using biological treatment and/or chemical treatment. Furthermore, fluid injection may result in migration of contaminants into adjacent soil.

Soil vapor extraction (SVE) is a process that may be used to remove contaminants from subsurface soil. During SVE, some vacuum is applied to draw air through the subsurface soil. Vacuum may be applied at a soil/air interface or through vacuum wells placed within the soil. The air may entrain and carry volatile contaminants toward the vacuum source. Off-gas removed from the soil by the vacuum may include contaminants that were within the soil. The off-gas may be transported to a treatment facility. The off-gas removed from the soil may be processed in the treatment facility to eliminate or reduce contaminants within the off-gas. SVE may allow contaminants to be removed from soil without the need to move or significantly disturb the soil. For example, SVE may be performed under roads, foundations, and other fixed structures.

Permeability of subsurface soil may limit the effectiveness of SVE. Air and vapor may flow through subsurface soil primarily through high permeability regions of the soil. The air and vapor may bypass low permeability regions of the soil, allowing relatively large amounts of contaminants to remain in the soil. Areas of high and low permeability may be characterized by, for example, moisture, stratified soil layers, and fractures and material heterogeneities within the soil.

Water may be present within soil. At a certain level within some soil, pore spaces within the soil become saturated with water. This level is referred to as the saturation zone. In the vadose zone, above the saturation zone, pore spaces within the soil are filled with water and gas. The interface between the vadose zone and the saturated zone is referred to as the water table. The depth of the water table refers to the depth of the saturated zone. The saturated zone may be limited by an aquitard. An aquitard is a low permeability layer of soil that inhibits migration of water.

Reduced air permeability due to water retention may inhibit contact of flowing air with contaminants in the soil during SVE soil remediation. Dewatering the soil may partially solve the problem of water retention. The soil may be dewatered by lowering the water table and/or by using a vacuum dewatering technique. These methods may not be effective methods of opening the pores of the soil to admit airflow. Capillary forces may inhibit removal of water from the soil when the water table is lowered. Lowering the water table may result in moist soil, which may limit air conductivity.

A vacuum dewatering technique may have practical limitations. The vacuum generated during a vacuum dewatering technique may diminish rapidly with distance from the dewatering wells. The use of vacuum dewatering may not significantly decrease water retention in the soil. This method may also result in the formation of preferential passageways for air conductivity located adjacent to the dewatering wells.

Many types of soil are characterized by horizontal layering with alternating layers of high and low permeability. A common example of a layered type of soil is lacustrine sediments, characterized by thin beds of alternating silty and sandy layers. Attempts to conduct SVE in such layers result in airflow that occurs substantially within the sandy layers and bypasses the silty layers.

Heterogeneities may be present in soil. Air and vapor may preferentially flow through certain regions or layers of heterogeneous soil, such as gravel beds. Air and vapor may be impeded from flowing through other regions or layers of heterogeneous soil, such as clay beds. Also, for example, air and vapor tend to flow preferentially through voids in poorly compacted fill material. Air and vapor may be impeded from flowing through overly compacted fill material. Buried debris within fill material may also impede the flow of air through soil.

Some components of soil contamination may be toxic. Such soil contamination may include mercury, mercury-containing compounds such as dimethyl mercury, volatile hazardous compounds, and combinations thereof. Placement of wells or use of invasive testing procedures to identify the location and extent of the soil contamination may require special measures to ensure that the surrounding environment and workers are not exposed to contaminated vapor, dust, or other forms of contamination during installation and use of the wells or testing procedures. Such measures may include, but are not limited to, placing dust or vapor producing operations within enclosures to prevent release of contaminants to the environment, treating air within such enclosures to remove or reduce contamination before releasing the air to the environment, equipping workers with appropriate protective clothing, and/or equipping workers with appropriate breathing filters or separate source air supplies.

In some cases, removal of some contaminants from affected soil may be impractical, but removal of other contaminants may be desirable. Removal of some contaminants may be impossible or impractical, but it may be desirable to remove or reduce other contaminants within the soil to inhibit such contamination from migrating to other areas through the soil.

SUMMARY OF THE INVENTION

An in situ thermal desorption ("ISTD") soil remediation system may be used to remediate contaminated soil within a treatment area. In an ISTD soil remediation system, heater wells may be used to heat the soil to desorb and/or destroy contaminants entrained in the soil. The soil remediation system may include a number of vapor extraction wells (sometimes referred to as "extraction wells") and/or heater-vapor extraction wells (sometimes referred to as "heater-extraction wells") that remove off-gas from the soil. The soil may be heated by heater-vapor extraction wells and by heater wells. The heater wells may be placed in rings around vapor extraction wells and/or heater-vapor extraction wells. Placement and operation of vapor extraction wells and/or heater-vapor extraction wells within a treatment area may allow reduction of soil contamination within the treatment area while providing a significant economic advantage over other available soil treatment systems. Heater wells, vapor extraction wells, and/or heater-vapor extraction wells may be operated in a sequence to avoid generating positive pressure within the soil. Positive pressure within the soil may result in migration of contamination within or from the treatment area.

A soil remediation system embodiment may include a plurality of heater wells and at least one vapor extraction well. An embodiment may include a barrier to define a treatment area and thus limit the volume of soil to be remediated. The barrier may partially or completely define a perimeter of the treatment area. The barrier may inhibit water recharge into soil within the treatment area. The barrier may also inhibit fluid from migrating out of the treatment area into adjacent soil areas. The barrier may be, but is not limited to, sheets inserted into the soil, a grout wall, and/or a freeze wall. In other soil remediation system embodiments, treatment areas may not be surrounded by barriers.

An amount of water in a treatment area may be estimated by testing cores taken from the treatment area, by logging techniques, and/or by measuring an amount of water in off-gas removed from the soil. Heat may be applied to the contaminated soil from heater wells at a rate sufficient to vaporize water in the treatment area. The heating rate may be controlled to generate water vapor in the soil in quantities that can be removed by vapor extraction wells and/or heater-vapor extraction wells such that positive pressure is not generated within the soil. This is advantageous, since a positive pressure in the soil may allow contamination within the soil to migrate out of the treatment area. Vaporized water, vaporized contamination, entrained contamination, and other material may be removed from the soil as off-gas through vapor extraction wells and/or heater-vapor extraction wells.

Applying heat to the soil and removing off-gas from the soil may result in an increase in soil permeability during soil remediation. Vapor extraction wells and/or heater-vapor extraction wells work more effectively in soil that is relatively permeable. Therefore, soil that is relatively permeable may require a reduced number of vapor extraction wells and/or heater-vapor extraction wells per unit volume of soil. A reduced number of vapor extraction wells and/or heater-vapor extraction wells may improve the economics of a soil remediation system. Vapor extraction wells and combined heater-vapor extraction wells are typically more expensive than heater wells. Limiting the number of vapor extraction and/or heater-vapor extraction wells may reduce the cost of the soil remediation system.

Limiting the number of vapor extraction or heater-vapor extraction wells may offer other cost advantages as well. For a given soil surface area, a lower number of vapor extraction wells and/or heater-vapor extraction wells in substantially regular, efficient patterns may result in a lower flow of off-gas from the soil, as compared to a higher off-gas flow resulting from uneven vapor flow between ineffectively spaced vapor extraction wells. Simpler and smaller vapor collection piping and treatment facilities may be able to handle the lower flow of off-gas removal from the soil, whereas larger vapor collection piping and treatment facilities may be needed to accommodate the higher flow of off-gas removal from the soil. Thus, operating and capital costs associated with the treatment facilities of the soil remediation system may be lower for efficiently spaced wells.

Heater wells may be placed in rings around a vapor extraction well and/or heater-vapor extraction well. The vapor extraction well and/or the heater-vapor extraction well and the first ring of heater wells may be activated to begin remediating the soil. The next ring of heater wells may be activated after a selected time interval has elapsed. In an alternative embodiment, the next ring of heater wells may be activated after vacuum influences the next ring of heater wells. The vacuum attained may indicate that the activated wells have increased the permeability of the soil at a selected distance of the next ring of heater wells from the activated wells. The increased permeability of the contaminated soil may be indicated by the amount of vapor extracted through the vapor extraction well and/or heater-vapor extraction well. The next ring of heater wells may be activated after an inner ring of activated wells has reached a predetermined quantity of injected heat. Temperature and/or pressure measurements may be taken at a heater well of the next heater well ring or at a test well or test wells between the activated wells and the next heater well ring.

In some soil remediation system embodiments, it may be advantageous to introduce a fluid into the soil. The fluid may be, but is not limited to, a drive fluid, a reactant, a solvent, a surfactant, and/or a heat transfer fluid. A drive fluid may move contamination toward vapor extraction wells and/or heater-vapor extraction wells. A reactant may react with contamination to destroy contamination and/or produce volatile reaction products that may be removed from the soil as a portion of the off-gas. A solvent or surfactant may be used to increase fluid flow adjacent to wells. A heat transfer fluid may be used to convectively transfer heat to the soil. In some embodiments, fluid may be injected into the soil through pressurized injection wells. In other embodiments, fluid may be introduced into injection wells, and vacuum drawn on the soil by vapor extraction wells and/or heater-vapor extraction wells may draw the fluid into the soil. Allowing the vapor extraction wells and/or heater-vapor extraction wells to draw the fluid into the soil may advantageously inhibit production of positive pressure within the soil.

In certain embodiments, injection wells may be converted vapor-extraction wells and/or heater-vapor extraction wells. The vapor extraction wells and/or heater-vapor extraction wells may be disconnected from a vacuum system, and the wells may be connected to a fluid supply system that introduces the fluid into the wells. In some embodiments, separate injection wells may be installed in a pattern within the soil. A combination of extraction wells (extractors), injection wells (injectors), and heater wells arrayed in patterns in the soil may provide a distribution of fluids and heat that allows for enhanced soil remediation.

Some soil remediation process embodiments may inhibit or prevent spread of contaminants caused by heat injection into the soil. A ring of vapor extraction wells may surround a desired treatment area. Vapor extraction wells in the outer ring may be activated at a selected time or when measurements indicate that the wells are influenced, or may soon be influenced, by heater wells, vapor extraction wells, and/or heater-vapor extraction wells that are used to remediate the soil. Measurements may include, but are not limited to, temperature and/or pressure measurements.

BRIEF DESCRIPTION OF THE DRAWINGS

Objects and advantages of the invention will become apparent upon reading the following detailed description and upon reference to the accompanying drawings in which.

Figure 1:
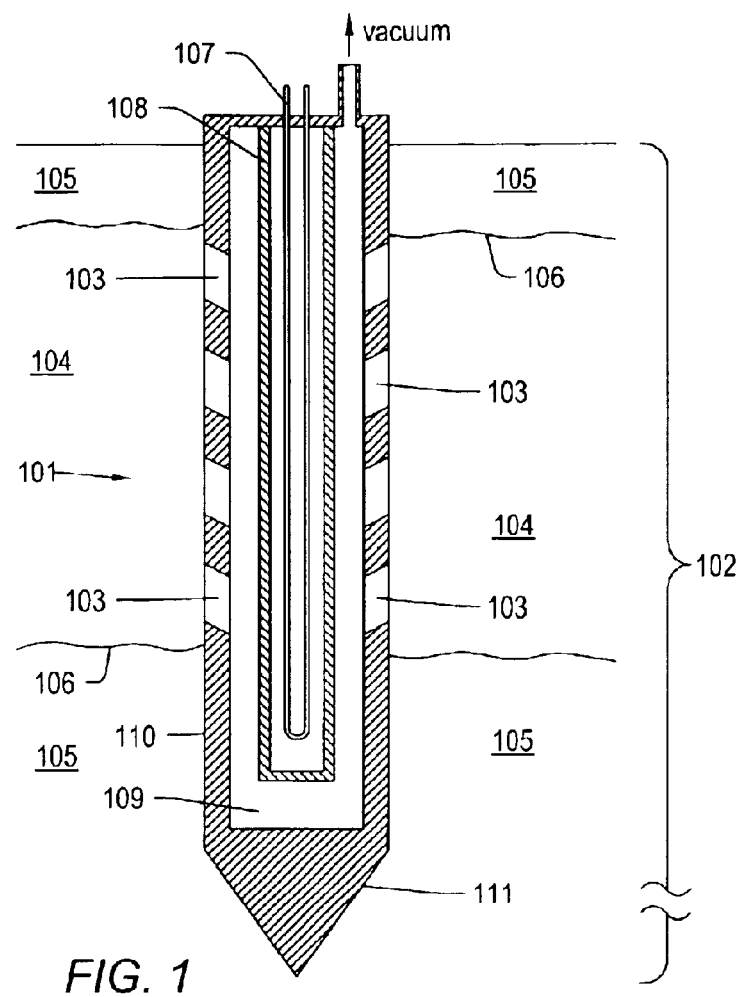
FIG. 1 depicts a cross-sectional view of an embodiment of a well inserted into the ground.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF PREFERRED EMBODIMENTS

An in situ thermal desorption (ISTD) process system may be used to remediate contaminated soil. An ISTD soil remediation process involves in situ heating of the soil to raise the temperature of the soil while simultaneously removing off-gas by vacuum. Heating the soil may result in removal of contaminants by a number of mechanisms. Such mechanisms may include, but are not limited to: vaporization and vapor transport of the contaminants from the soil; evaporation, entrainment, and removal of contaminants into an air or water vapor stream; and/or thermal degradation or conversion of contaminants into non-contaminant compounds by pyrolysis, oxidation, or other chemical reactions within the soil.

An ISTD soil remediation process may offer significant advantages over soil vapor extraction (SVE) processes and processes that depend on injection of drive fluids, chemical reactants, and/or biological reactants into the soil. Fluid flow conductivity of an average soil may vary by a factor of $10^8$ throughout the soil, due in part to soil heterogeneities and water within the soil. As used herein, "fluid" refers to matter that is in a liquid or gaseous state. Mass transport of fluid through the soil may be a limiting factor in the remediation of a treatment site using SVE or chemical and/or biological treatment of the soil. In contrast to variations in fluid flow permeability in soil, heat flow in soil may vary by a factor of only about two throughout the soil. Furthermore, injecting heat into soil may be significantly more uniform than injecting a fluid through the same soil. Injecting heat into soil may result in a preferential increase in the permeability of tight soil. Injected heat may dry the soil. As the soil dries, microscopic and macroscopic permeability of the soil may increase. The increase in permeability of heated soil may allow an ISTD soil remediation process to more uniformly remove or reduce contaminants to acceptable levels throughout a treatment area. The increase in soil permeability may allow in situ remediation of low permeability clays and silts that are not amenable to standard soil vapor extraction processes.

U.S. Patent Application Publication No. US 2003-0120772 A1 to Vinegar et al. U.S. Patent Application Publication No. US 2003-0110794 A1 to Stegemeier et al. and U.S. Patent Application Publication No. US 2004-0120771 A1 to Vinegar et al. describe ISTD soil remediation processes. Each of these references is incorporated by reference as if fully set forth herein.

In a soil remediation embodiment, a method of decontamination includes heating the contaminated soil to temperatures at which the contaminants are removed by vaporization and/or thermal destruction. In situ water may vaporize and entrain contaminants, allowing removal from the soil through extraction wells.

Soil may be heated by a variety of methods. Methods for heating soil include, but are not limited to, heating by thermal radiation or conduction from a heat source, heating by radio frequency heating, or heating by electrical soil resistivity heating. "Radiative heating" refers to radiative heat transfer from a hot source to a colder surface. In an ISTD process, heat is then transferred primarily by conduction from the heated soil surface to adjacent soil, thereby raising the soil temperature at some distance from the heat source. Radiative and/or conductive heating may be advantageous because temperatures obtainable by such heating are not limited by the amount of water present in the soil. Soil temperatures substantially above the boiling point of water may be obtained using radiative and/or conductive heating. Soil temperatures of about 212° F. (100° C.), 250° F. (121° C.), 300° F. (149° C.), 400° F. (204° C.), 750° F. (399° C.), 1000° F. (538° C.), or greater may be obtained using radiative and/or conductive heating. The heat source for radiative and/or conductive heating may be, but is not limited to, an electrical resistance heater placed in a wellbore, a heat transfer fluid circulated through a wellbore, or combustion within a wellbore.

Heaters may be placed in or on the soil to heat the soil. For soil contamination within about 3 feet of the soil surface, thermal blankets and/or ground heaters on top of the soil may apply conductive heat to the soil. A vacuum system may draw a vacuum on the soil through vacuum ports that pass through the thermal blanket. The heaters may operate at about 1600° F. (871° C.). U.S. Pat. No. 5,221,827 issued to Marsden et al., which is incorporated by reference as if fully set forth herein, describes a thermal blanket soil remediation system. U.S. Pat. No. 4,984,594 issued to Vinegar et al., which is incorporated by reference as if fully set forth herein, describes an in-situ method for removing contaminants from surface and near-surface soil by imposing a vacuum on the soil beneath a impermeable flexible sheet and then heating the soil with an electric surface heater that is positioned on the soil surface under the sheet.

For deeper contamination, heater wells may be used to supply heat to the soil. U.S. Pat. No. 5,318,116 and U.S. Pat. No. 6,824,328 to Vinegar et al. and U.S. Pat. No. 6,632,047 to Vinegar et al., each of which is incorporated by reference as if fully set forth herein, describe ISTD soil remediation processes for treating contaminated subsurface soil with radiative and/or conductive heating. U.S. Pat. No. 6,688,387 to Wellington et al.; U.S. patent Publication No. US 2003-0136558 A1 to Wellington et al.; and U.S. Patent Application Publication No. US 2003-0192691 A1, also describe heaters and various equipment. Each of these applications is incorporated by reference as if fully set forth herein.

Some heater wells may include perforated casings that allow fluid to be removed from the soil. A heater well with a perforated casing may also allow fluid to be drawn or injected into the soil. Vacuum may be applied to the soil to draw fluid from the soil. The vacuum may be applied at the surface or through extraction wells placed within the soil.

The term "wells" refers to heater wells, extraction wells, injection wells, and test wells. Soil temperature may be raised using heater wells. Fluid from the soil may be withdrawn from the soil through extraction wells. Some extraction wells may include heater elements. Such extraction wells, which are referred to as "heater-extraction wells," are capable of both raising soil temperature and removing fluid from the soil. In a region adjacent to a heater-extraction well, heat flow may be counter-current to fluid flow. Fluid withdrawn from the heater-extraction well may be exposed to a high enough temperature within the heater-extraction well to result in the destruction of some of the contaminants within the fluid. Injection wells allow a fluid to be inserted into the soil. Sampling or logging of the soil or fluid from the soil may be performed using test wells that are positioned at desired locations within a well pattern of a soil remediation system.

An in situ soil remediation system may include a plurality of heater wells and at least one vapor extraction well. A vapor extraction well may also include one or more heater elements. Heater-vapor extraction well heater elements may provide heat for establishing an initial permeability in the vicinity of the vapor extraction well. The additional heat may also prevent condensation of water vapor and contaminants in the well. In some extraction well embodiments, the extraction wells may not include heater elements. Absence of heater elements within the vapor extraction well may simplify the design of the vapor extraction wellbore, and may be preferred in some applications.

Wells may be arranged in a pattern of rows and columns within the soil. Rows of wells may be staggered so that the wells are in a triangular pattern. Alternatively, the wells may be aligned in a rectangular pattern, pentagonal pattern, hexagonal pattern, or higher order polygonal pattern. A distance between adjacent wells may be a substantially fixed distance so that polygonal well patterns may be made up from regular arrays of equilateral triangles or squares. A spacing distance between adjacent wells of a pattern may range from about 3 feet to about 40 feet or more. A typical spacing distance may be from about 6 to 12 feet. A consolidated, or substantially consolidated, soil having a high heat transfer capacity may allow for a relatively larger spacing between adjacent heater wells. An unconsolidated, or substantially unconsolidated, soil may require a relatively smaller spacing between heater wells. Some wells may be placed out of a regular pattern to avoid obstructions within the pattern.

An ISTD soil remediation process may have several advantages over SVE. Heat added to the contaminated soil may raise the temperature of the soil above the vaporization temperatures of contaminants within the soil. If the soil temperature exceeds the vaporization temperature of a soil contaminant, the contaminant may vaporize. Vacuum applied to the soil may be able to draw the vaporized contaminant out of the soil. Even heating the soil to a temperature below vaporization temperatures of the contaminants may have beneficial effects. Increasing the soil temperature may increase vapor pressures of the contaminants in the soil and allow an air stream to remove a greater portion of the contaminants from the soil than is possible at lower soil temperatures. Increased permeability of the soil due to heating may allow removal of contaminants throughout a soil treatment area.

Many soil formations include a large amount of water as compared to contaminants. Raising the temperature of the soil to the vaporization temperature of water may vaporize the water. The water vapor may help volatilize and/or entrain contaminants within the soil. Vacuum applied to the soil may remove the volatilized and/or entrained contaminants from the soil. Vaporization and entrainment of contaminants may result in the removal of medium and high boiling point contaminants from the soil.

In addition to allowing greater removal of contaminants from the soil, the increased heat of the soil may result in the destruction of contaminants in situ. The presence of an oxidizer, such as air or water vapor, may result in the oxidation of the contaminants that pass through high temperature soil. In the absence of oxidizers, contaminants within the soil may be altered by pyrolysis. Vacuum applied to the soil may remove reaction products from the soil.

A heating and vapor extraction system may include heater wells, extraction wells, injection wells, and/or test wells. Heater wells apply thermal energy to the soil to increase soil temperature. Extraction wells of a heating and vapor extraction system may include perforated casings that allow off-gas to be removed from the soil. The casing or a portion of the casing may be made of a metal that is resistant to chemical and/or thermal degradation. Perforations in a well casing may be plugged with a removable material prior to insertion of the casing into the ground. After insertion of the casing into the ground, the plugs in the perforations may be removed. U.S. Pat. No. 6,543,539 to Vinegar et al., which is incorporated by reference as if fully set forth herein, describes wells that are installed with removable plugs placed within perforations of the well casings. Perforations in a well casing may be, but are not limited to, holes and/or slots. The perforations may be screened. The casing may have several perforated zones at different positions along a length of the casing. When the casing is inserted into the soil, the perforated zones may be located adjacent to contaminated layers of soil. The areas adjacent to perforated sections of a casing may be packed with gravel or sand. The casing may be sealed to the soil adjacent to non-producing soil layers to inhibit migration of contaminants into uncontaminated soil.

FIG. 1 depicts a schematic view of casing 101. Casing 101 may be placed within soil or ground 102. Casing 101 may include perforations or openings 103 that allow fluid to flow into or out of the casing. Portions of casing 101 may be positioned proximate contaminated soil 104, and portions of the casing may be proximate uncontaminated soil 105. Interfaces 106 separate proximate soil layers. Well casing 101 may form a part of a vapor extraction well, a heat or fluid injection well, a combination heater-vapor extraction well, or a test well. A vapor extraction well may be used to remove off-gas from contaminated soil 104. The off-gas may include, but is not limited to, air, water, and contaminants that were within soil 102.

Fluid may be introduced into the soil through an injection well. The fluid may be, but is not limited to, a heat source such as steam, a solvent, a surfactant, a chemical reactant such as an oxidant, a biological treatment carrier, and/or a drive fluid that forces fluids within soil 102 toward a vapor extraction well. A drive force for injecting the fluid into soil 102 may be supplied through casing 101 or from a proximate well or wells. The injection well may include a perforated casing. The injection well may be similar to an extraction well, except that fluid is inserted into the soil through perforations in the well casing instead of being removed from the soil through perforations in the well casing. Fluid may be drawn or injected into the soil.

A test well may be used to determine the structure and layering of soil 102; to take gas samples to determine the location and concentration of contaminants; or to serve as a logging well for use with gamma ray logging tools, neutron logging tools, or other types of logging tools to measure properties within the soil, such as, but not limited to, pressure and temperature.

An ISTD soil remediation system may include a number of component systems. The systems may include a heating and vapor extraction system, an off-gas collection piping system, an off-gas treatment system, and instrumentation and power control systems. The heating and vapor extraction system may include thermal blankets for treating contaminated soil that is close to the surface, or heater wells for treating contaminated soil at greater depths. A soil remediation system may include both thermal blankets and heater wells.

An extraction, injection, or test well may be placed in a drilled or augered hole. Cuttings made during the formation of the hole may require separate treatment to eliminate contaminants within the cuttings. Alternatively, an extraction, injection, or test well may be vibrated and/or driven into the soil. U.S. Pat. No. 3,684,037 issued to Bodine and U.S. Pat. No. 6,039,508 issued to White describe systems for sonically drilling wells. Both of these patents are incorporated by reference as if fully set forth herein. Vibrating or driving a well into the ground may limit generation of cuttings and/or vapors during insertion of the well into the ground.

An off-gas collection piping system may be connected to extraction wells of a heating and vapor extraction system. The off-gas collection piping system may also be connected to an off-gas treatment system so that off-gas removed from the soil may be transported to the treatment system. The off-gas collection piping may be un-heated piping that conducts off-gas and condensate to the treatment facility. U.S. Pat. No. 6,824,328 to Vinegar et al., describes a vapor collection system for an ISTD remediation system. Alternatively, the off-gas collection piping may be heated piping that inhibits condensation of off-gas within the collection piping.

An instrumentation and power control system may be used to monitor and control the heating rate of the heater system. The instrumentation and power control system may also be used to monitor the vacuum applied to the soil and to control of the operation of the off-gas treatment system.

Figure 2:
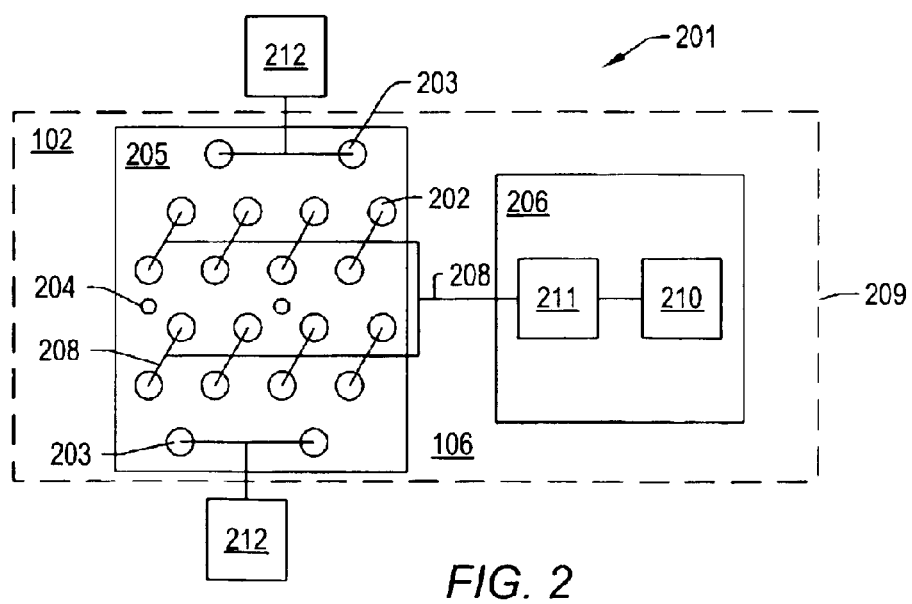
FIG. 2 depicts a schematic diagram of an embodiment of an in situ soil remediation system.

FIG. 2 depicts a schematic diagram of an embodiment of soil remediation system 201. Soil remediation system 201 may be used to treat contaminated soil by removing or substantially reducing the amount of contamination within soil 102. Soil remediation system 201 may be, but is not limited to, a soil vapor extraction ("SVE") system or an in situ thermal desorption ("ISTD") remediation system. Soil remediation system 201 may include one or more vapor extraction or combination heater-vapor extraction wells 202. Soil remediation system 201 may optionally include one or more heater or fluid injection wells 203 and one or more test wells 204. Injection wells 203 and/or test wells 204 may be located inside or outside of a pattern of vapor extraction wells 202. A well casing that includes perforations or openings may be part of vapor extraction wells 202, injection wells 203, or test wells 204 of soil remediation system 201. In some embodiments, portions of vapor extraction wells and/or injection wells may include open wellbore portions.

Soil remediation system 201 may include ground cover 205, treatment facility 206, vapor collection system 208, control system 209, and a plurality of extraction wells 202. Soil remediation system 201 may also include injection wells 203 and/or test wells 204. Ground cover 205 may be placed over wells 202 to inhibit heat loss as well as undesired contaminant vapor loss to the atmosphere. Ground cover 205 may also inhibit excess air from being drawn into soil 102. Ground cover 205 may include a layer of insulation. Ground cover 205 may also include a layer impermeable to contaminant vapor and/or air. Ground cover 205 may not be needed if the contamination is at a depth within soil 102 such that heating the soil and removing off-gas from the soil will have negligible effect at ground surface 106 of the soil.

Treatment facility 206 may include vacuum system 210 that draws an off-gas stream from soil 102. Treatment facility 206 may also include a contaminant treatment system 211 for treating contaminants in the off-gas. Contaminant treatment system 211 may eliminate contaminants from the off-gas stream or reduce the contaminants to acceptable levels. Contaminant treatment system 211 may include, but is not limited to, a reactor system such as a thermal oxidation reactor, a mass transfer system such as activated carbon beds, or a combination of reactor systems and mass transfer systems.

Vapor collection system 208 may include a piping system that transports off-gas removed from soil 102 to treatment facility 206. The piping system may be coupled to vacuum system 210 and to vapor extraction wells 202. In an embodiment, the piping may be thermally insulated and heated. The insulated and heated piping may inhibit condensation of off-gas within the piping. In some embodiments, the piping may be un-heated piping and/or un-insulated piping.

Control system 209 may be a computer control system. Control system 209 may monitor and control the operation of treatment facility 206, heated vapor collection system 208, and/or a plurality of wells 202. Control system 209 may monitor and control power input into heater elements of the plurality of wells 202.

Wells 202 of soil remediation system 201 may be vapor extraction wells that are coupled to collection system 208. Wells 202 may be placed in a pattern at a remediation site. The pattern of wells 202 may be, but is not limited to, a triangle or square well pattern. The pattern may promote removal of vapor throughout soil 102.

Some soil remediation systems 201 may apply heat to soil 102. Thermal energy may be supplied to soil 102 by, for example, a radio frequency heating system, an electrical soil resistivity heating system, or a thermal conduction system. In an embodiment of ISTD system 201, heater elements may be placed in separate wells that are laterally spaced from vapor extraction wells 202.

In an embodiment of an electrical soil resistivity heating system, electrical current may be supplied to soil 102 from perforated casing 101, as shown in FIG. 1. In another embodiment, heater element 107 may be a radiant heater contained within un-perforated heater casing 108. Gravel pack 109 and/or spacers may be placed between heater casing 108 and perforated casing 101 to provide thermal conductivity while inhibiting electrical contact with perforated casing 101. Alternatively, no gravel pack may be positioned adjacent to the heater casing 108, and heater casing 108 may radiantly heat perforated casing 101. Electrically insulating spacers may be included in casing 101 to inhibit electrical contact of heater element 107 with heater casing 108. Heater element 107 may be coupled to a power source. When power is supplied to heater element 107, the temperature of the heater element increases, and heat may be transferred to gravel pack 109, perforated casing 101, and soil 102.

Heat injection rates may be between about 200 watts per hour per linear foot of a heat injection well and about 600 watts per hour per linear foot of a heat injection well with about a four-inch diameter using a stainless steel casing. Temperatures may be limited to about 1700° F. (or about 925° C.). Initially, higher heat injection rates may be tolerated due to the relatively rapid heat transfer to the cooler soil around the heater. As the soil continues to heat, the transfer of heat from the casing takes place more slowly.

A heat injection profile along a heating element may be designed to achieve a desired heating pattern. In an embodiment, a diameter along portions of the element may vary according to a target heat injection profile. For example, the diameter of a lower portion of the element may be smaller for more rapid heating of a lower portion of adjacent soil. Rapid heating of soil below the level of contamination may be desired to prevent downward migration of contaminants into lower soil.

As shown in FIG. 2, soil remediation facility 201 may include injection wells 203. Injection wells 203 may use pumps 212 to force material into soil 102. Alternatively, fluids may be drawn into soil 102 through injection well 203 by vacuum imposed at a separate location. Injections wells 203 may also be controlled by control system 209. The material introduced into soil 102 may be a heat source (such as steam), a reactant, a solvent, a surfactant, or a drive fluid that pushes formation fluid toward a vapor extraction well. The reactant may be an oxidant. The oxidant may be, but is not limited to, air, water, oxygen, and/or hydrogen peroxide.

Well casings 101 may be cylindrical sections of pipe with openings formed in wall 110 of the pipe, as shown in FIG. 1. In some embodiments, the diameter of the casing for a heat injection well may be between about 2 inches and about 6 inches. Larger diameters increase the surface area from which heat may be conducted and permit greater heat fluxes from the wellbore. For example, with a casing diameter of about 4 inches, a heat flux of about 457 watts per linear foot of heater well may be achieved with a casing surface temperature of about 900° C. This may provide a reasonable heat injection rate without requiring expensive metallurgy for the casing. Larger diameters may require excessively large forces to press or pound the casing into the ground without pre-drilling a wellbore. Larger casings may also increase the cost of the casing. In other embodiments, perforated casing 101 may have a geometric shape other than cylindrical. U.S. Pat. No. 5,403,119 to Hoyle, which is incorporated by reference as if fully set forth herein, describes non-cylindrical casings that may be used for soil remediation.

Well casing 101, as shown in FIG. 1, may be inserted into ground 102 using a variety of techniques. Perforated casing 101 may be inserted, for example, by placing the casing within a wellbore or trench, by driving the casing into soil 102 with a pile driver or similar equipment, or by vibrationally inserting the casing into the soil. Gravel packing 109 may be placed within perforated sections of casing 101. Non-perforated sections of casing 101 may be cemented or sealed to soil 102 to inhibit contamination migration and excess off-gas production through the casing. A wellbore may be produced by augering a hole in soil 102. Installing casing 101 within ground 102 by inserting the casing into a wellbore or trench may be problematic since cuttings may be produced during the formation of the wellbore or trench for well casing 101.

If the contaminants within soil 104 include hazardous material, cuttings removed during the formation of the wellbore may also include hazardous material. The cuttings may require disposal or off-site treatment at an approved facility. Dust and/or vapors may also be generated during the formation of the augered hole or trench. Special dust and vapor containment procedures may be needed to minimize exposure of workers to dust and/or vapors. Such procedures may make placement of well casings 101 into augered holes or trenches expensive. Inhibiting dust and/or the transport of dust or vapor through well casings 101 during insertion into ground 102 may obviate the need for special dust and/or vapor containment procedures and may allow the well casings to be installed more economically.

Driving or vibrating casing 101 into ground 102 may reduce the generation of dust and vapor during installation of the casing. Driving or vibrating casing 101 into soil 102 may also eliminate the need to place gravel pack 109 between the soil and the casing. Driving or vibrating casing 101 into ground 102 may be a practical method of installing a well within soil that is contaminated with highly toxic material. Highly toxic materials may include, but are not limited to, metallic contaminants, such as mercury; or hazardous hydrocarbons, chlorinated hydrocarbons, or hydrocarbon-containing contaminants, such as dioxin or dimethyl mercury.

Casing 101 may have end 111 that facilitates placing the casing into ground 102. End 111 may have a tapered tip. In an embodiment of casing 101, end 111 may taper to a point, as shown in FIG. 1. In some embodiments, the leading end of a well casing that is driven or vibrated into the ground may have a blunt or rounded tip. An end of a well casing may also include a cutting edge that helps insert casing 101 deeper into soil 102 when the casing is rotated. A portion of end 111 of casing 101 may additionally be flared so that a maximum diameter or thickness of the end is larger than a diameter or thickness of the casing.

Contaminated soil 104 surrounding casing 101 may be subject to thermal conduction from the casing when heating element 107 is energized. The uniform application of heat in the soil remediation process may be accomplished by controlling both the vertical and the areal distribution of power into the wells.

A barrier may be placed around a region of soil that is to be treated. U.S. Pat. No. 6,419,423 to Vinegar et al., which is incorporated by reference as if fully set forth herein, describes a barrier for an ISTD soil remediation system. The barrier may include metal plates that are driven into the soil around a perimeter of a contaminated soil region. In some embodiments, a barrier may be a grout wall formed in the soil. In some embodiments, a barrier may be a frozen barrier formed by freeze wells spaced about a treatment area. A ground cover for the soil remediation system may be sealed to the barrier. The barrier and the ground cover may limit the amount of air and water drawn into the treatment area from the surroundings. Limiting the amount of air drawn through the soil may increase the vacuum established within the soil and may reduce the amount of off-gas that needs to be processed. The barrier may also inhibit spreading of contamination from the contaminated region to adjacent areas. A barrier formed by inserted plates may have a limited depth. A grout wall may be formed to significantly greater depths by drilling a series of interlinked holes in the soil and filling the holes with grout. Required precision in hole formation, number of holes required to surround a treatment area, and other factors may limit the viability of forming a grout wall to provide a barrier for soil remediation. Shallow depth grout walls may be formed by filling trenches with grout.

The areal distribution of heat may be accomplished by spacing wells in regular arrays that provide substantially uniform heating in interwell regions. Triangular well arrays or square arrays may be used, depending on surface geometrical constraints. For example, wells placed in square arrays along buildings or other obstacles may provide a more convenient arrangement. Triangular heat injection arrays may substantially minimize the spacing between heaters and may also provide quicker, more uniform heating of an interwell region. In addition, patterns of vapor extraction wells spaced in triangular arrays may also overlay a triangular array of heater-only wells.

A "pattern" is defined herein as the shape of a drainage boundary of a single vapor extraction well. Pattern boundaries are indicated in FIGS. 3–6 by solid lines. The heater-only wells (indicated by small black dots) may be arranged in rings, as indicated by dashed lines, around the vapor extraction wells (indicated by larger black dots). In the embodiments described herein, the drainage pattern of each extraction well may be a hexagon that contains a plurality of heater wells.

Extraction wells, which may include heater elements, and heater wells may be located approximately at apices of triangles in a triangular grid ("apex centered") or centered within triangles of the triangular grid ("triangle centered"). Properties of four different types of patterns are listed in TABLES 1–4 below and shown in FIGS. 3–6. In some arrangements, as shown in FIG. 3A–FIG. 3D and TABLE 1, the extraction wells are spaced by a multiple of the altitude of triangles in the triangular grid or "altitude spaced." For example, the extraction well spacing in FIG. 3A is about twice the altitude of the triangles in the triangular grid. In other arrangements, as shown in FIG. 4A–FIG. 4D and TABLE 2, the extraction wells may be spaced by a multiple of a length of a side of a triangle in the triangular grid, or "line spaced." For example, the extraction well spacing in FIG. 4A is about twice the length of a side of triangles in the triangular grid. FIG. 5A–FIG. 5D and TABLE 3 illustrate patterns in which extraction wells are triangle centered and lined spaced and heater wells are apex centered. FIG. 6A–FIG. 6D and TABLE 4 illustrate patterns of vapor extraction wells and heater wells that include fluid injection wells. Each of these patterns may be expanded to include additional heaters. TABLES 1–3 list extraction well spacing, area per pattern, number of heater well rings, heater/extraction well ratios, and area per heater well. TABLE 4 lists extraction well spacing, injection well spacing, number of heater well rings, heater/extraction/injection well ratios, and area per heater well.

TABLE 1

Triangular Arrays
All Wells Apex Centered with Heater Well Spacing = s
Altitude Spaced Extraction Well Patterns

| Figure | Designation | Extraction Well Spacing | Area/Pattern | No. of Heater Well Rings | Heater/Extraction Well Ratio | Area/Heater Well |
|---|---|---|---|---|---|---|
| 3A | AH-1 | 1.732s | $2.598s^2$ | 1 | 2:1 | $1.299s^2$ |
| 3B | AH-2 | 3.464s | $10.392s^2$ | 2 | 11:1 | $0.945s^2$ |
| 3C | AH-3 | 5.196s | $23.382s^2$ | 3 | 26:1 | $0.899s^2$ |
| 3D | AH-4 | 6.928s | $41.569s^2$ | 4 | 47:1 | $0.884s^2$ |
| (not shown) | AH-5 | 8.660s | $64.950s^2$ | 5 | 74:1 | $0.878s^2$ |

TABLE 2

Triangular Arrays
All Wells Apex Centered with Heater Well Spacing = s
Line Spaced Extraction Well Patterns

| Figure | Designation | Extraction Well Spacing | Area/Pattern | No. of Heater Well Rings | Heater/Extraction Well Ratio | Area/Heater Well |
|---|---|---|---|---|---|---|
| 4A | AL-1 | 2s | $3.464s^2$ | 1 | 3:1 | $1.155s^2$ |
| 4B | AL-2 | 3s | $7.794s^2$ | 2 | 8:1 | $0.974s^2$ |
| 4C | AL-3 | 4s | $13.85s^2$ | 2 | 15:1 | $0.924s^2$ |
| 4D | AL-4 | 5s | $21.65s^2$ | 3 | 24:1 | $0.902s^2$ |
| (not shown) | AL-5 | 6s | $31.176s^2$ | 4 | 35:1 | $0.891s^2$ |

TABLE 3

Triangular Arrays
Apex Centered Heater Wells with Spacing = s
Triangle Centered and Line Spaced Extraction Well Patterns

| Figure | Designation | Extraction Well Spacing | Area/Pattern | No. of Heater Well Rings | Heater/Extraction Well Ratio | Area/Heater Well |
|---|---|---|---|---|---|---|
| 5A | TL-1 | s | $0.866s^2$ | 1 | 1:1 | $0.866s^2$ |
| 5B | TL-2 | 2s | $3.464s^2$ | 2 | 4:1 | $0.866s^2$ |
| 5C | TL-3 | 3s | $7.794s^2$ | 3 | 9:1 | $0.866s^2$ |
| 5D | TL-4 | 4s | $13.856s^2$ | 3 | 16:1 | $0.866s^2$ |
| (not shown) | TL-5 | 5s | $21.651s^2$ | 4 | 25:1 | $0.866s^2$ |
| (not shown) | TL-6 | 6s | $31.117s^2$ | 4 | 36:1 | $0.866s^2$ |

TABLE 4

Triangular Arrays
Apex Centered Heater Wells and Extraction Wells
with Heater Well Spacing = s
Extraction Well Patterns with Two
Injectors & Multiple Heater Wells

| Figure | Designation | Extractor Spacing | Injection Well Spacing | No. of Heater Well Rings | Heater/Extraction/Injection Well Ratio | Area/Heater Well |
|---|---|---|---|---|---|---|
| 6A | EIH-1 | 2s | 1.154s | 1 | 3:1:2 | $1.155s^2$ |
| 6B | EIH-2 | 3s | 1.732s | 1 | 6:1:2 | $1.299s^2$ |
| 6C | EIH-3 | 4s | 2.309s | 2 | 15:1:2 | $0.924s^2$ |
| 6D | EIH-4 | 5s | 2.887s | 3 | 24:1:2 | $0.902s^2$ |
| (not shown) | EIH-5 | 6s | 3.464s | 3 | 33:1:2 | $0.945s^2$ |

The patterns described herein may provide a variety of options for sequential injection of heat in soil remediation. Embodiments of options are illustrated by the patterns described in FIG. 3A–FIG. 3D and TABLE 1. FIG. 3A shows a triangular pattern of all apex centered wells with spacing s. The vapor extraction wells 301 are altitude spaced at twice the triangle altitude (about √3s or 1.732s) with a hexagonal pattern of one ring 303 of six heater wells surrounding each vapor extraction well. The area of each hexagonal pattern is the area of six triangles, or approximately ½×altitude×base×6, or ½×(½√3s)×(s)×6=3√3s²/2= $2.598s^2$. Each heater well 302 in this configuration may be adjacent to three vapor extraction wells 301. As such, each ring 303 of six heater wells 302 may contribute two equivalent heater wells per pattern for a heater/extraction well ratio of 2:1. Thus, each heater well may be associated with an area of approximately $2.598s^2/2$, or $1.299s^2$, of each hexagonal pattern.

Figure 3B:
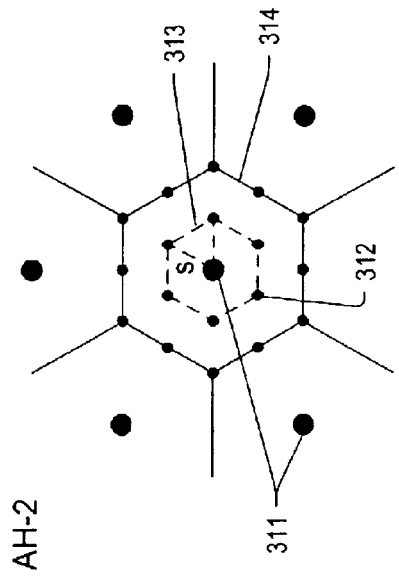
FIG. 3A–FIG. 3D depicts plan views of apex centered arrays of altitude spaced patterns of heater wells and vapor extraction wells for four heater/extraction well ratios.

FIG. 3B shows a pattern of vapor extraction wells surrounded by two hexagonal rings of heater wells. In this pattern, vapor extraction wells 311 may be spaced at a distance of about 2√3s, and heater wells 312 may be located at all other grid positions. In this manner, the pattern results in a ratio of heater wells to vapor extraction wells that approaches 11:1. Thus, with a pattern area of approximately $10.392s^2$, each heater well may be associated with an area of approximately $0.945s^2$.

Figure 3D:
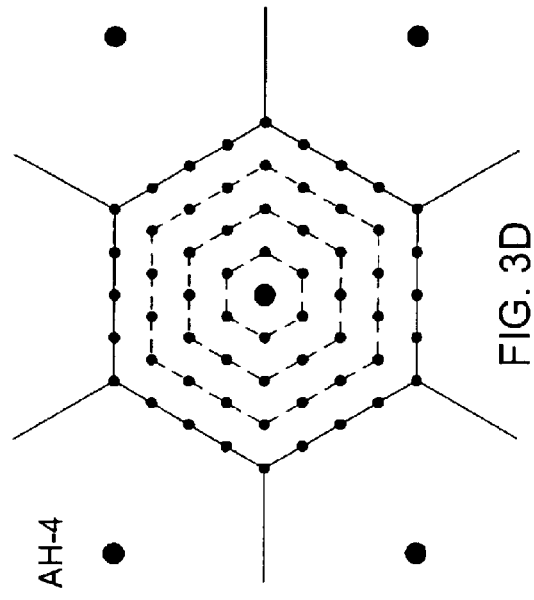
Figure 3A:
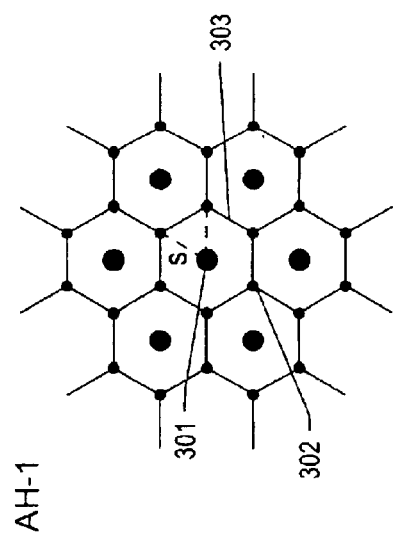
Figure 3C:
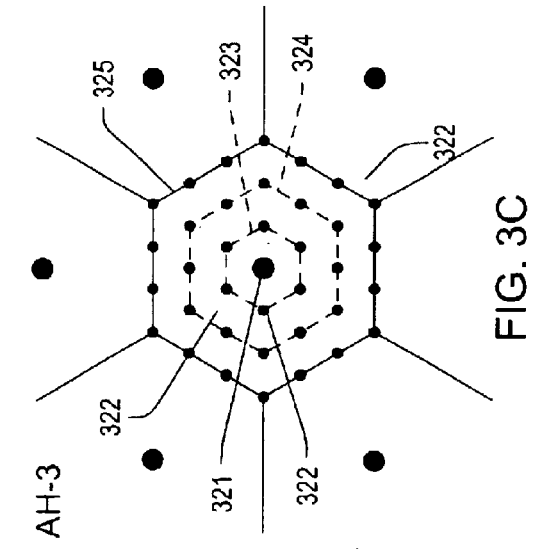

FIG. 3C shows three rings of heater wells surrounding each vapor extraction well. Vapor extraction well 321 may be surrounded by ring 323 of six heater wells 322, and second hexagonally shaped ring 324 of twelve heater wells 322 may surround the inner ring of heater wells 323. These eighteen heater wells are assumed to contribute all of their heat to the vapor extraction well that they encircle. Third ring 325 of eighteen heater wells 322 may surround the second ring. Of the eighteen wells in ring 325, the six wells at the hexagon apices contribute ⅓ of their heat to the central vapor extraction well. The remaining twelve wells contribute ½ of their heat to the central vapor extraction well. The sum of these contributions results in a ratio of heater wells to vapor extraction wells of about 26:1. Thus, with a pattern area of approximately $23.382s^2$, each heater well may be associated with an area of approximately $0.899s^2$.

FIG. 3D and TABLE 1 show the possibility of larger patterns with greater space between vapor extraction wells. FIG. 3D adds a fourth hexagonally shaped ring of twenty-four heater wells, including eighteen wells that contribute one-half of their heat to the central vapor extraction well (18×½-wells) and six wells that contribute one-third of their heat to the central vapor extraction well (6×⅓-wells). This pattern results in a ratio of heater wells to vapor extraction wells of about 47:1. Thus, with a pattern area of approximately $41.569s^2$, each heater well may be associated with an area of approximately $0.884s^2$.

The distance that the vapor extraction wells are to be separated may be determined by factors such as the pressure drop through the soil and the time required for remediation. The most significant pressure drop for vapors traveling through the soil to the vapor extraction wells occurs proximate the extraction well. As such, the amount of heat that may be injected and, hence, the amount of vapor that may be generated for each vapor extraction well, may be limited. An insufficient number of vapor extraction wells may result in an extended time for remediation.

The heat injection wells may be separated by about 3 feet to about 25 feet. Further separation may extend the time for remediation. Conversely, closer spacing may substantially increase the cost for the heater wells.

Embodiments of triangular patterns of all apex centered wells with spacing s are shown in FIG. 4A–FIG. 4D and TABLE 2. The triangular array of FIG. 4A with spacing s may have vapor extraction wells 401 line spaced at a distance of about 2s and hexagonal patterns with single rings 403 of six heater wells. Each heater well 402 may be proximate two vapor extraction wells 401. In this manner, each ring 403 of six heater wells 402 contributes three equivalent heater wells per pattern, for a heater/extraction well ratio of 3:1. Thus, with a pattern area of approximately $3.464s^2$, each heater well may be associated with an area of approximately $1.155s^2$.

Figure 4B:
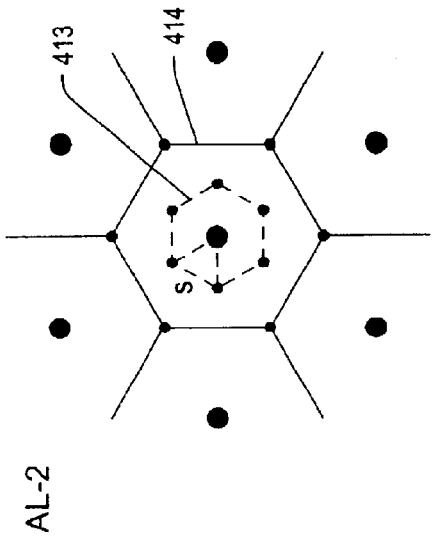
FIG. 4A–FIG. 4D depicts plan views of apex centered arrays of line spaced patterns of heater wells and vapor extraction wells for four heater/extraction well ratios.

In a further embodiment, FIG. 4B illustrates a pattern of vapor extraction wells with inner hexagonal ring 413 and outer hexagonal ring 414 of heater wells. In this pattern, the vapor extraction wells may be spaced at a distance of about 3s, and heater wells may be located at all other grid positions. Both hexagonal rings may include six heater wells. This pattern results in a heater/extraction well ratio of 8:1. Thus, with a pattern area of approximately $7.794s^2$, each heater well may be associated with an area of approximately $0.974s^2$.

Figure 4D:
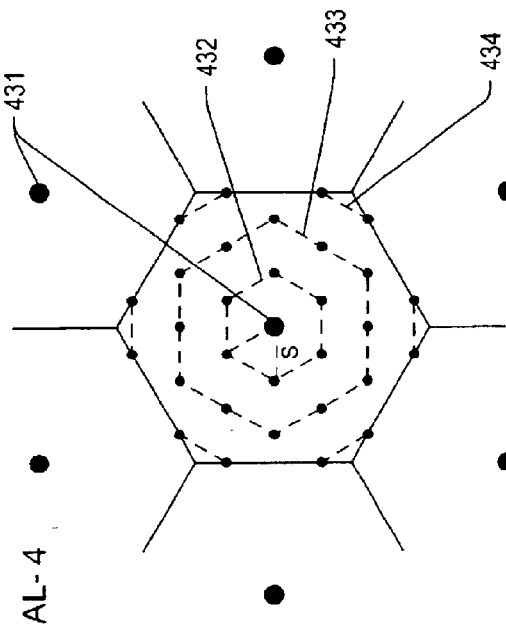
Figure 4A:
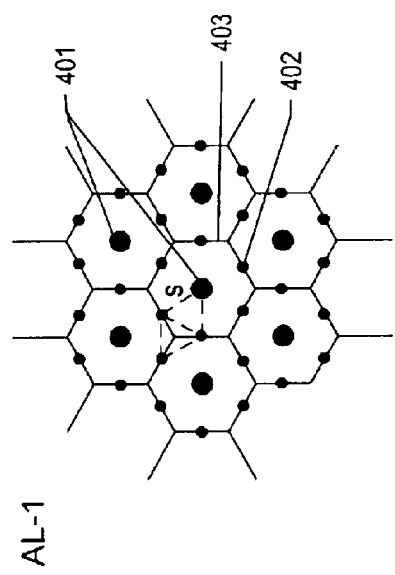
Figure 4C:
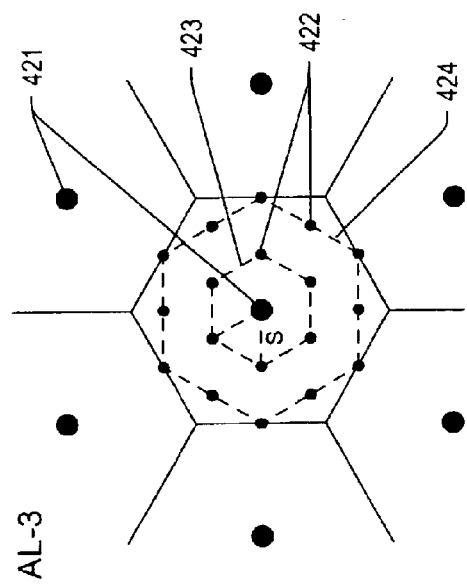

FIG. 4C illustrates another configuration of a pattern of vapor extraction wells with two hexagonal rings of heater wells surrounding each vapor extraction well. Vapor extraction wells 421 may be surrounded by ring 423 of six heater wells 422. The vapor extraction wells may be spaced at a distance of about 4s. Second hexagonally shaped ring 424 of twelve heater wells may surround inner ring 423. This pattern results in a ratio of heater wells to vapor extraction wells that will approach 15:1 as the number of patterns becomes larger. Thus, with a pattern area of approximately $13.85s^2$, each heater well may be associated with an area of approximately $0.924s^2$.

FIG. 4D illustrates triangular patterns of heater wells in which three hexagonally shaped rings of heater wells surround each vapor extraction well. Vapor extraction wells 431 may be surrounded by a ring of six heater wells 432. A second hexagonal pattern 433 of twelve heater wells may surround inner ring 432 of heater wells, and a third set of heater wells 434 may surround second ring 433. This pattern results in a ratio of heater wells to vapor extraction wells of about 24:1. Thus, with a pattern area of approximately $21.65s^2$, each heater well may be associated with an area of approximately $0.902s^2$.

FIG. 5 illustrates patterns in which extraction wells may be located centrally in a triangular grid, i.e., approximately equidistant from apex centered heater wells with spacing s. The properties of each pattern in FIG. 5 are given in TABLE 3. FIG. 5A shows the triangular grid with spacing s with vapor extraction wells 501 line spaced at a distance of about s. Each vapor extraction well may be surrounded by three heater wells 502. Each heater well 502 may be adjacent to three vapor extraction wells 501. As such, each ring 503 of three heater wells 502 contributes one equivalent heater well per pattern. This pattern results in a ratio of heater wells to vapor extraction wells of about 1:1. Thus, with a pattern area of approximately $0.866s^2$, each heater well may be associated with an area of approximately $0.866s^2$.

Figure 5B:
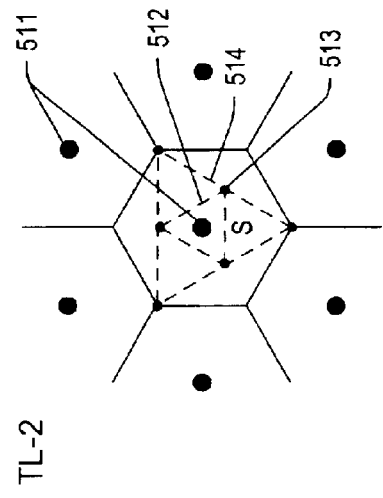
FIG. 5A–FIG. 5D depicts plan views of apex centered heater wells and triangle centered patterns of vapor extraction wells for four heater/extraction well ratios.

FIG. 5B shows a pattern of vapor extraction wells 511 with inner triangular ring 512 and outer triangular ring 514 of heater wells 513. In this pattern, the vapor extraction wells may be spaced at a distance of about 2s and heater wells may be located at all other grid positions. In this manner, inner ring 512 contributes three equivalent heater wells per extraction well and outer ring 514 contributes one equivalent heater well per extraction well. This pattern results in a ratio of heater wells to vapor extraction wells of about 4:1. Thus, with a pattern area of approximately $3.464s^2$, each heater well may be associated with an area of approximately $0.866s^2$.

Figure 5D:
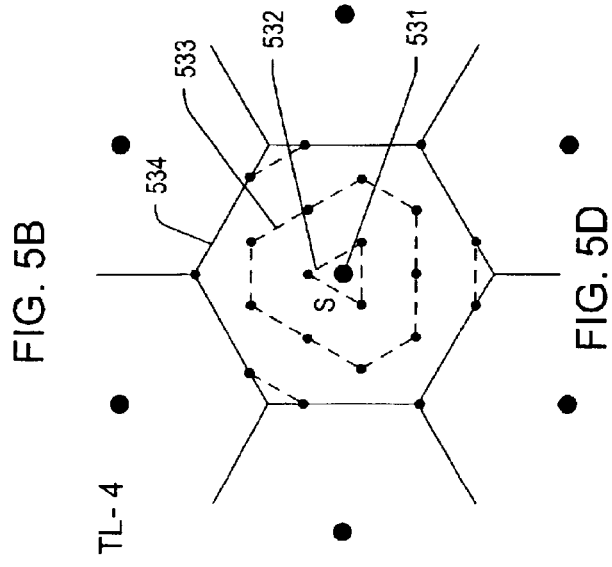
Figure 5A:
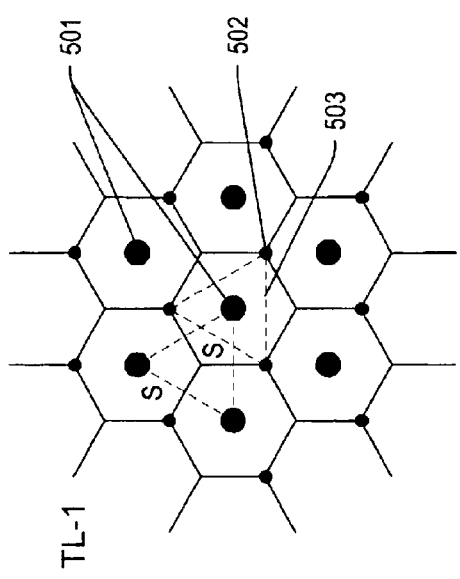
Figure 5C:
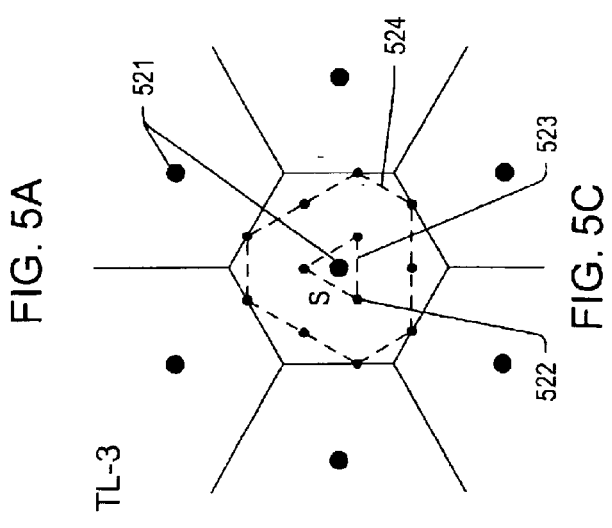

FIG. 5C illustrates a pattern of vapor extraction wells with one inner triangular ring of heater wells surrounding each vapor extraction well and one irregular hexagonal ring surrounding the inner triangular ring of heater wells. Vapor extraction wells 521 may be surrounded by ring 523 of three heater wells 522. Vapor extraction wells may be spaced at a distance of about 3s. Irregular hexagonally shaped ring 524 of nine heater wells may surround inner ring 523 of heater wells. This pattern results in a heater/extraction well ratio of 9:1. Thus, with a pattern area of approximately $7.794s^2$, each heater well may be associated with an area of approximately $0.866s^2$.

FIG. 5D shows another configuration of triangular patterns of heater wells in which three rings of heater wells surround each vapor extraction well. Vapor extraction wells 531 may be surrounded by inner ring 532 of three heater wells. Irregular hexagonally shaped ring 533 of nine heater wells may surround inner triangular ring 532 of heater wells, and irregular hexagonally shaped ring 534 of heater wells may surround second ring 533. This pattern results in a ratio of heater wells to vapor extraction wells of about 16:1. Thus, with a pattern area of approximately $13.856s^2$, each heater well may be associated with an area of approximately $0.866s^2$.

In an embodiment, a method of remediation using patterns of wells having multiple rings of heater wells, as described herein, may include activating the inner ring of heaters in such a manner that the heat injection rate generates only the amount of vapor that can be forced through the existing soil permeability to the vapor extraction wells. As a region of increased permeability grows with heating, and as the soil in the inner hexagons dries out, the distance over which contaminants may travel to the vapor extraction well without spreading outside of the initially contaminated zone substantially increases. As such, heat may be subsequently applied further away from the vapor extraction wells.

The patterns described in FIGS. 3–5 may be operated by first activating the vapor extraction wells, or optionally, heater-vapor extraction wells, to increase the permeability of the soil near the vapor extraction wells. Alternatively, one to three heater wells may be placed around the vapor extraction wells so that the design and installation of the individual wells may be simplified. Heat injection may initially be limited to a rate which is slightly less than that required to generate water vapor approximately equal to the amount of vapor being extracted in the vapor extraction well. Air may be drawn into the vapor extraction well provided withdrawal rates are high enough to maintain steam and contaminants at sub-atmospheric pressures within the pattern of the heater wells.

After the region near the vapor extraction wells has been heated to a desired permeability, the heater wells further from the vapor extraction wells may be activated. Because of the potentially significant increase in permeability caused by the heating process, the vapors may be extracted at significant distances from the point at which heat was injected.

The embodiments described herein take advantage of the considerable increase in permeability created by heating even very tight or dense clay soils. The permeability of the contaminated soil may optionally be increased by fracturing the soil. Soil may be fractured by one or more of several methods, including pneumatics, hydraulics, and explosives. Permeability may also be created by a combination of removing liquid water, microfracturing clay layers and soil as steam is expelled, and oxidizing organic material. Permeability may increase by a factor of about 100 to about 10,000, depending on, for example, the initial permeability of the soil. The increase in permeability may result in transport of vapors containing contaminants over a considerable distance and, as such, may reduce the number of vapor extraction wells needed for remediation. The distance between vapor extraction wells may become significant as the heat injection is increased from a relatively low initial rate to a significantly greater rate as the permeability increases.

Figure 6A:
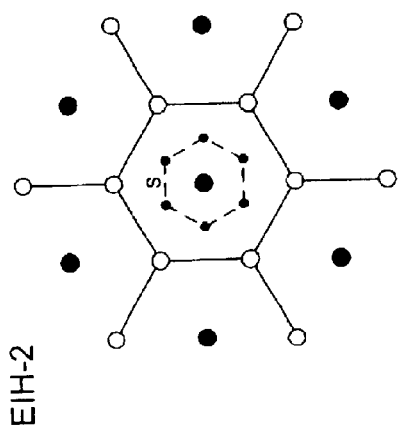
FIGS. 6A–6D depicts plan views of various arrays of vapor extraction wells, heater wells, and fluid injection wells.

Patterns for soil remediation sites that may benefit from fluid injection as well as heat injection are shown in FIG. 6A through FIG. 6D. The well patterns shown in FIGS. 6A through 6D are triangular patterns of all apex centered heater and extraction wells. Spacing of a triangle side is equal to s. In the patterns, extraction wells 601, heater wells 602, and fluid injection wells 603 may be arranged to uniformly distribute heat and fluids throughout the treated regions of the soil. FIG. 6A illustrates vapor extraction well patterns line spaced at a distance of about 2s, with six fluid injection wells 603 ($6 \times \frac{1}{3}$-wells or two equivalent wells) per pattern. The injection wells may be located approximately at the perimeter of the hexagonal pattern of the central vapor extraction well. Six heater wells ($\frac{1}{2}$-wells) 602 may also be located approximately on the perimeter of the pattern, thereby providing three equivalent heaters per pattern.

Figure 6B:
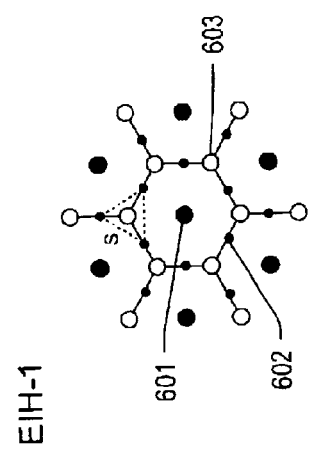
Figure 6C:
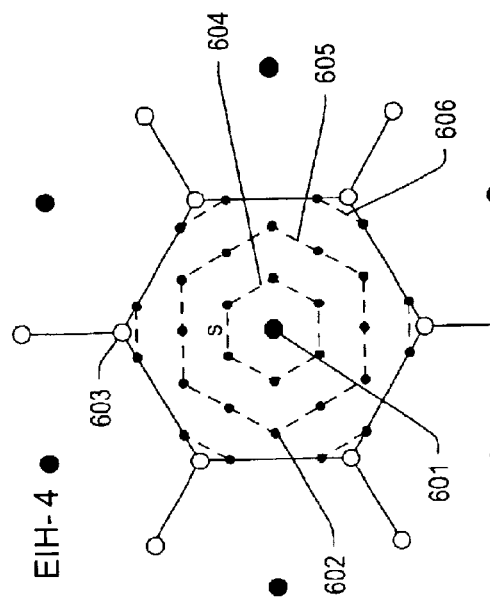
Figure 6D:
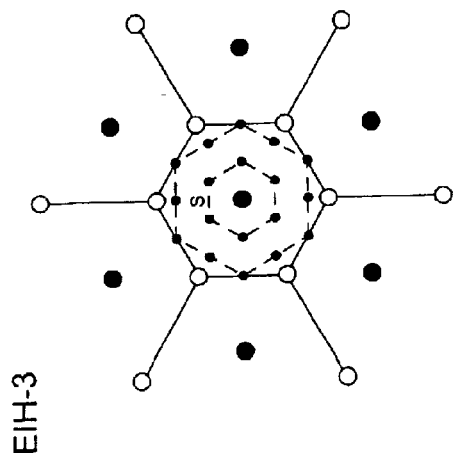

Additional heater wells may be located in the patterns by expanding the vapor extraction well spacing. FIGS. 6B–D show successive expansion of these patterns to accommodate the additional heaters. Properties of these well patterns are given in TABLE 4 and are similarly determined, for example, as for the patterns in TABLE 2. In an embodiment, vapor extraction wells 601 may be arranged in the largest triangular array; fluid injectors 603 in their triangular array may be smaller by a linear factor of about $1/\sqrt{3}$; and array of heater wells 602 may be smaller by factors of ⅓, ¼, etc.

An operational sequence for the pattern in FIG. 6D may be as follows:

(1) apply vacuum and energize heater in vapor extraction well 601;
(2) when vacuum is attained, energize inner ring heaters 604;
(3) when vacuum is attained, energize mid-ring heaters 605;
(4) when vacuum is attained, energize outer ring heaters 606; and
(5) when adequate vacuum is attained in wells 603, allow injection fluids to be drawn into soil and be collected at vapor extraction well 601.

In one embodiment, heat may be applied to injection wells before initiating injection of fluids. Alternatively, energizing each subsequent ring of heaters may be based on a predetermined time, quantity of heat injected, or flux of a heater well ring located closer to the vapor extraction wells.

EXAMPLE

An increase in permeability caused by heating of soil in an in situ thermal desorption process was demonstrated by coring soil samples before and after a demonstration thermal desorption test. Coring was done before and after 42 days of heating from perforated heater-vapor extraction wells. Twelve heater-vapor extraction wells, each 12 feet deep, were provided on a 5-foot triangular spacing. The heaters of the wells were controlled to maintain a maximum heater operating temperature of about 1600° F. (871° C.). The initial heat injection was about 500 watts per linear foot of heater injection well. Later, the heat injection rate was lowered to about 350 watts per foot as the soil surrounding the wellbores was heated to avoid overheating the wells. A vacuum of 25 inches of water was initially imposed on the heater-extraction wells. During the first 48 hours of heating, the vacuum fell to about 5 inches of water and remained at that level, with a vapor production of about 50 scfm to 70 scfm for the total of the twelve wells. Monitoring wells placed at the midpoints between the heater wells showed an initial pressure of about 1 inch of water vacuum, which increased to about 4.5 inches of water vacuum at the end of the 42 day heating period. The average pressure gradient in the soil decreased by a factor of 48, from about 24 inches to about 0.5 inches of water.

The soil surrounding the wells was initially contaminated with up to 20,000 ppm of polychlorinated biphenyls ("PCBs"). The PCBs were removed to a composite average of less than 33 ppb by the heating process, with all samples having a composite average of less than 1 ppm of PCB.

Core samples taken after heating showed large increases in both porosity and permeability of the soil. The porosity increased from approximately 30% of initial pore volume to approximately 40%. The horizontal air permeability, measured with in situ moisture retained, increased from about $3 \times 10^{-3}$ millidarcy (md) to 50 md. The vertical air permeability increased from about $1 \times 10^{-3}$ md to 30 md.

This example demonstrates how heating increases soil permeability, and thus increases the distance contaminants can be transported through the soil. The heating initiated near a vapor extraction well was controlled so that vapors generated were captured by the vapor extraction wells and were not transported to uncontaminated surrounding soils.

An advantage of a soil remediation system that uses vapor extraction wells and/or heater-vapor extraction wells that are surrounded by a ring or rings of heater wells may be that the wells are activated in sequence to inhibit generation of a positive pressure in the soil that might cause migration of contamination in the soil or into the atmosphere. Heater well rings may be activated in sequence according to a time schedule or when the heater wells are influenced, or about to be influenced, by previously activated wells. Heater wells may be supplied with energy at a rate that will inhibit generation of vapor at an amount that is greater than the amount of vapor that is removed by adjacent vapor extraction wells and/or heater-vapor extraction wells.

Another advantage of a soil remediation system that uses vapor extraction wells and/or heater-vapor extraction wells that are surrounded by a ring or rings of heater wells may be that a number of vapor extraction wells and/or heater-vapor extraction wells in the soil remediation system may be optimized. The use of a limited number of vapor extraction wells and/or heater-vapor extraction wells may reduce the capital cost of a soil remediation system by allowing many of the soil remediation wells to be heater wells, which are less expensive than extraction wells. The use of a limited number of vapor extraction wells and/or heater-vapor extraction wells may reduce the size, capital cost, and operating cost of a treatment facility that treats contamination in off-gas removed from the soil.

Further advantages of a soil remediation system that uses vapor extraction wells and/or heater-vapor extraction wells that are surrounded by a ring or rings of heater wells may include that the system is simple, efficient, reliable, and relatively inexpensive. The system may also be easy to manufacture, install, and use.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of remediating contaminated soil, comprising:

providing heat from a plurality of heater wells to at least one portion of a treatment area, wherein the plurality of heater wells comprises one or more first rings of heater wells, at least one first ring surrounding one or more vapor extraction wells, and one or more second rings of heater wells, at least one second ring surrounding one of the first rings of heater wells, and wherein the treatment area comprises contaminated soil;

wherein providing heat comprises activating at least one of the first rings of heater wells before activating at least one of the second rings of heater wells;

allowing the heat to transfer from the plurality of heater wells to at least a portion of the treatment area, wherein the heat vaporizes at least some compounds in the treatment area;

removing vapors from the treatment area with at least one of the vapor extraction wells; and controlling a pressure of vapors in at least a portion of the treatment area by controlling heat provided from one or more of the heater wells.

2. The method of claim 1, further comprising controlling a pressure in at least a portion of the treatment area by controlling vapors removed from the treatment area.

3. The method of claim 1, further comprising varying an amount of heat transferred to at least a portion of the treatment area as a function of an amount of vapor that is removed.

4. The method of claim 1, further comprising applying a vacuum to at least a portion of the treatment area for removing the vapors, and further comprising varying an amount of compounds vaporized in the treatment area as a function of the vacuum applied to the treatment area.

5. The method of claim 1, wherein compounds in the treatment area comprise water and contaminants.

6. The method of claim 5, further comprising estimating an amount of water in the treatment area.

7. The method of claim 6, further comprising varying an amount of heat transferred to at least a portion of the treatment area as a function of the estimate of the amount of water in the treatment area.

8. The method of claim 6, further comprising controlling the heat transferred such that the heat transferred is less than the heat required to vaporize substantially all of the estimated amount of water in the treatment area.

9. The method of claim 1, further comprising activating at least one of the first rings of heater wells after a vacuum is applied to at least a portion of the treatment area.

10. The method of claim 1, further comprising activating at least one of the first rings of heater wells after a predetermined period of time.

11. The method of claim 1, further comprising inhibiting migration of the vapors from the treatment area by controlling the pressure of vapors in at least a portion of the treatment area.

12. The method of claim 1, wherein at least 6 heater wells are provided for each vapor extraction well.

13. The method of claim 1, wherein at least one of the vapor extraction wells is laterally spaced from another one of the vapor extraction wells by a minimum of about 3 feet.

14. The method of claim 1, wherein the heater wells are laterally spaced apart by about 3 feet to about 25 feet.

15. The method of claim 1, wherein at least one of the vapor extraction wells comprises at least one heater element.

16. The method of claim 1, wherein at least one of the vapor extraction wells comprises one or more heater elements, and further comprising heating the treatment area by first activating at least one of the heater elements in at least one of the vapor extraction wells comprising the one or more heater elements.

17. The method of claim 1, wherein at least one of the vapor extraction wells comprises one or more heater elements, and further comprising heating the treatment area by activating at least one of the first rings of heater wells surrounding at least one of the vapor extraction wells comprising one or more heater elements subsequent to activating at least one of the heater elements in at least one of the vapor extraction wells comprising the one or more heater elements.

18. The method of claim 1, wherein an array of vapor extraction wells overlays an array of heater wells.

19. The method of claim 1, wherein a substantially equilateral triangular array of vapor extraction wells overlays a substantially equilateral triangular array of heater wells.

20. The method of claim 1, further comprising providing one or more fluid injection wells in the treatment area.

21. The method of claim 20, wherein at least one of the fluid injection wells comprises at least one heater element.

22. The method of claim 20, further comprising activating at least one of the fluid injection wells after a vacuum is applied to at least a portion of the treatment area.

23. The method of claim 20, wherein an array of the fluid injection wells overlays an array of heater wells and vapor extraction wells.

24. The method of claim 1, further comprising increasing the permeability of the treatment area by at least about 100 times.

25. A method of remediating contaminated soil, comprising:

providing a plurality of heater wells within the contaminated soil;

providing one or more vapor extraction wells within the contaminated soil;

wherein a first ring of heater wells surrounds at least one of the vapor extraction wells, and a second ring of heater wells surrounds the first ring of heater wells;

withdrawing vapors from at least one of the vapor extraction wells;

estimating an amount of water in the contaminated soil; and applying heat from the plurality of heater wells to at least a portion of the contaminated soil to vaporize less than the estimated amount of water in the contaminated soil, wherein applying heat comprises activating the first ring of heater wells before activating the second ring of heater wells.

26. The method of claim 25, further comprising controlling a pressure of vapors in at least a portion of the contaminated soil by controlling heat provided from the plurality of heater wells.

27. The method of claim 25, further comprising controlling a pressure in at least a portion of the treatment area by controlling vapors withdrawn from the contaminated soil.

28. The method of claim 25, further comprising varying an amount of heat transferred to at least a portion of the contaminated soil as a function of an amount of vapor that is removed.

29. The method of claim 25, further comprising varying an amount of heat transferred to at least a portion of the contaminated soil as a function of the estimated amount of water in the contaminated soil.

30. The method of claim 25, further comprising applying a vacuum to at least a portion of the treatment area for removing the vapors, and further comprising varying an amount of compounds vaporized in the contaminated soil as a function of the vacuum applied to the contaminated soil.

31. The method of claim 25, further comprising activating one or more of the plurality of heater wells after a vacuum is applied to at least a portion of the contaminated soil.

32. The method of claim 25, further comprising activating one or more of the plurality of heater wells after a predetermined period of time.

33. The method of claim 25, further comprising inhibiting migration of the vapors from the contaminated soil by controlling a pressure of vapors in at least a portion of the contaminated soil.

34. The method of claim 25, wherein at least 6 heater wells are provided for each vapor extraction well.

35. The method of claim 25, wherein at least one of the vapor extraction wells is laterally spaced from another one of the vapor extraction wells by a minimum of about 3 feet.

36. The method of claim 25, wherein the heater wells are laterally spaced apart by about 3 feet to about 25 feet.

37. The method of claim 25, wherein at least one of the vapor extraction wells comprises one or more heater elements.

38. The method of claim 37, further comprising heating the contaminated soil by first activating at least one of the heater elements in at least one of the vapor extraction wells comprising the one or more heater elements.

39. The method of claim 37, further comprising heating the contaminated soil by activating at least one of the heater wells closest to at least one of the vapor extraction wells comprising the one or more heater elements subsequent to activating at least one of the heater elements in at least one of the vapor extraction wells comprising the one or more heater elements.

40. The method of claim 25, wherein an array of vapor extraction wells overlays an array of the heater wells.

41. The method of claim 25, wherein a substantially equilateral triangular array of vapor extraction wells overlays a substantially equilateral triangular array of the heater wells.

42. The method of claim 25, further comprising providing one or more fluid injection wells in the contaminated soil.

43. The method of claim 42, wherein at least one of the fluid injection wells comprises at least one heater element.

44. The method of claim 42, further comprising activating at least one of the fluid injection wells after a vacuum is applied to at least a portion of the contaminated soil.

45. The method of claim 42, wherein an array of the fluid injection wells overlays an array of heater wells and vapor extraction wells.

46. The method of claim 25, further comprising increasing the permeability of the contaminated soil by at least about 100 times.

47. A soil remediation system adapted to remediate:
a treatment area comprising contaminated soil, comprising:
one or more vapor extraction wells;
plurality of heater wells comprising one or more first rings of heater wells, at least one of the first rings surrounds at least one of the vapor extraction wells, and one or more second rings of heater wells, at least one of the second rings surrounds one of the first rings of heater wells; and
a control system;
wherein the control system is configured to control a pressure in the contaminated soil by controlling (1) an amount of heat supplied to the soil by the heater wells, wherein the control system is configured to activate at least one of the first rings of heater wells before activating at least one of the second rings of heater wells, and (2) an amount of vapor removed from the soil through at least one of the vapor extraction wells.

48. The system of claim 47, wherein the control system is further configured to monitor a pressure in the contaminated soil.

49. The system of claim 47, wherein one or more of the vapor extraction wells comprise one or more heater elements.

50. The system of claim 49, wherein the control system is further configured to first activate at least one of the heater elements in at least one of the vapor extraction wells comprising the one or more heater elements to heat at least a portion of the contaminated soil.

51. The system of claim 49, wherein the control system is further configured to activate at least one of the heater wells closest to one of the vapor extraction wells comprising the one or more heater elements subsequent to activating at least one of the heater elements in at least one of the vapor extraction wells comprising the one or more heater elements.

52. The system of claim 47, wherein the control system is further configured to activate at least one of the heater wells after a vacuum is applied to at least a portion of the contaminated soil.

53. The system of claim 47, wherein the control system is further configured to activate at least one of the heater wells after a predetermined period of time.

54. The system of claim 47, wherein the control system is further configured to vary the amount of heat supplied to at least a portion of the contaminated soil as a function of the amount of vapor that is removed.

55. The system of claim 47, wherein the control system is further configured to control the pressure in the contaminated soil as a function of a vacuum applied to at least one of the vapor extraction wells.

56. The system of claim 47, further comprising an estimated amount of water in at least a portion of the contaminated soil.

57. The system of claim 56, wherein the control system is further configured to vary the amount of heat supplied to at least a portion of the contaminated soil as a function of the estimated amount of water in at least a portion of the contaminated soil.

58. The system of claim 56, wherein the control system is further configured to control the amount of heat supplied to at least a portion of the contaminated soil to vaporize less than the estimated amount of water in at least a portion of the contaminated soil.

59. The system of claim 56, wherein controlling the vapor pressure in at least a portion of the contaminated soil inhibits migration of vapors from the contaminated soil.

60. The system of claim 56, further comprising one or more fluid injection sources.

61. The system of claim 60, wherein at least one of the fluid injection sources comprises one or more heater elements.

62. The system of claim 61, wherein the control system is further configured to activate at least one of the fluid injection sources after a vacuum is applied to at least a portion of the contaminated soil.

63. The system of claim 56, wherein at least 6 heater wells are provided for each vapor extraction well.

64. The system of claim 56, wherein at least one of the vapor extraction wells is laterally spaced from another one of the vapor extraction wells by a minimum of about 3 feet.

65. The system of claim 47, wherein the heater wells are laterally spaced apart by about 3 feet to about 25 feet.

66. The system of claim 47, wherein an array of vapor extraction wells overlays an array of heater wells.

67. The system of claim 47, wherein a substantially equilateral triangular array of vapor extraction wells overlays a substantially equilateral triangular array of heater wells.

68. The system of claim 47, further comprising an array of fluid injection wells.

69. The system of claim 68, wherein an array of fluid injection wells overlays an array of heater wells and vapor extraction wells.

70. The system of claim 47, wherein the permeability of the contaminated soil is increased by at least about 100 times.

* * * * *

UNITED STATES PATENT AND TRADEMARK OFFICE
CERTIFICATE OF CORRECTION

PATENT NO. : 6,951,436 B2  
DATED : October 4, 2005  
INVENTOR(S) : Stegemeier et al.

It is certified that error appears in the above-identified patent and that said Letters Patent is hereby corrected as shown below:

Column 24,  
Lines 34, 37, 46 and 48, delete "claim 56" and substitute -- claim 47 --.

Signed and Sealed this

Twentieth Day of December, 2005

JON W. DUDAS  
*Director of the United States Patent and Trademark Office*